United States Patent [19]

Ahn et al.

[11] Patent Number: 5,053,272

[45] Date of Patent: Oct. 1, 1991

[54] OPTICAL STORAGE DEVICE

[75] Inventors: Kie Y. Ahn, Chappaqua; Jungihl Kim, Peeskill; Paul Lauro, Pomona; George F. Walker, New York, all of N.Y.

[73] Assignee: International Business Machines Corporation, Armonk, N.Y.

[21] Appl. No.: 297,792

[22] Filed: Jan. 13, 1989

[51] Int. Cl.⁵ .................. B32B 5/16; G11B 3/70; G11B 7/26

[52] U.S. Cl. .................. 428/323; 369/275.1; 369/288; 428/328; 428/458

[58] Field of Search ............... 428/328, 323, 334, 458, 428/64, 65, 701; 369/288, 275

[56] References Cited

U.S. PATENT DOCUMENTS

| | | | |
|---|---|---|---|
| 4,020,227 | 4/1976 | Deffeyes | 428/306 |
| 4,364,792 | 12/1982 | Gliem et al. | 156/628 |
| 4,465,767 | 8/1984 | Oba et al. | 430/271 |
| 4,522,880 | 6/1985 | Klostermeier et al. | 428/332 |
| 4,522,880 | 6/1985 | Klostermeier et al. | 428/332 |
| 4,543,295 | 9/1985 | St. Clair et al. | 428/458 |
| 4,670,325 | 6/1987 | Bakos et al. | 428/209 |
| 4,673,626 | 6/1987 | Takeda et al. | 430/14 |
| 4,711,822 | 12/1987 | Choyke et al. | 428/458 |
| 4,764,485 | 8/1988 | Loughran et al. | 437/225 |
| 4,818,852 | 4/1989 | Haddock et al. | 235/488 |
| 4,891,254 | 1/1990 | Bianco | 428/78 |

OTHER PUBLICATIONS

J. Adhesion Sci. Tech., vol. 1, No. 4, pp. 331-339 (1987), "Adhesion and Interface Srudies Between Copper & Polyimide".
Polymer Engr. and Science, vol. 27, No. 19, Oct., 1987, pp. 1421-1435, "Polymers as Substrates & Media for Data Storage". J. Adhesion Sci. Tech., vol. 2, No. 2, pp. 95-105 (1988), "Adhesion and interface Investigation of Polyimide on Metals".

Primary Examiner—George F. Lesmes
Assistant Examiner—Christopher Brown
Attorney, Agent, or Firm—Daniel P. Morris

[57] ABSTRACT

A structure, and method of fabrication thereof, having a polymeric layer containing a pattern of oxide particles embedded therein. The regions of the polymeric material having the oxide particles therein have an optical reflectivity or transmitivity which is different than the optical reflectivity or transmitivity of the regions of the polymeric material without the oxide particles. The structure can be used as an optical storage device.

19 Claims, 6 Drawing Sheets

FIG. 1
PRIOR ART
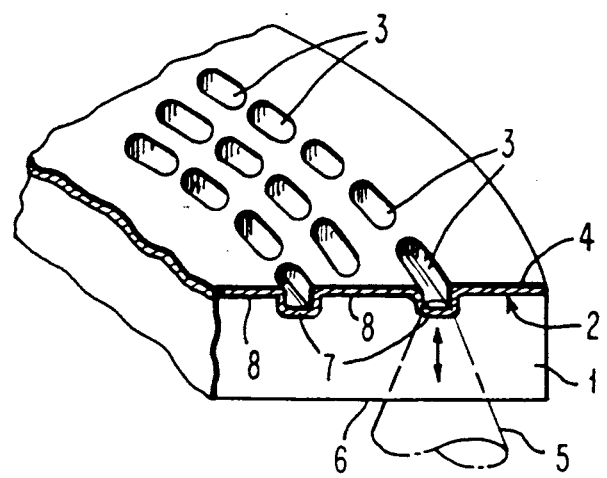
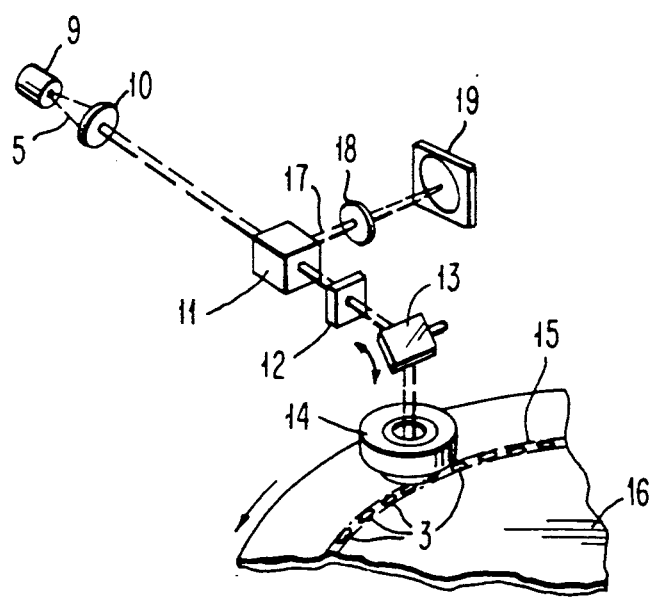
FIG. 2
PRIOR ART

OPTICAL STORAGE DEVICE

FIELD OF THE INVENTION

This invention relates to a polymeric material having a metal oxide pattern formed therein, more particularly to an optical storage device formed from a polymeric material having a metal oxide pattern formed therein which can be read optically.

BACKGROUND OF THE INVENTION

Non-erasable optical data storage memories have been recently introduced to the memory market. In the case of a compact disk, PCM signals (Pulse Code Modulated Signals) are embossed directly into a polymer substrate. This is done using an injection molding process by using a special mold which transfers microscopically small pits into the disk surface. The pitted surface is coated with a thin reflective material such as aluminum. The information on the disk is read out using a low energy laser. The laser irradiates the polymer side of the disk. The polymer is transparent. The laser reflects off the reflective surface. The Sequence of reflection and non-reflection caused by pit sequence on the disk surface is used as a binary code to store information.

A sensor, such as a photodiode, detects the reflected light from the pattern. An electrical signal generated in the detector is monitored to thereby permit reading of the data stored on the disk.

According to the present invention an optical storage device is fabricated from a polymeric material. Oxide particles are selectively formed in regions of a polymeric film on the surface of an optically reflecting substrate. The regions of the film having the oxide particles therein have a different reflectivity than those regions of the polymeric film which do not have the oxide particles therein. By scanning an optical beam across the pattern of oxide particles the reflected light can be monitored permitting data stored in the pattern sequence to be read.

It is an object of this invention to provide a polymeric material having a pattern of oxide particles therein.

It is an object of this invention to provide an optical storage device having a pattern of oxide particles embedded in a polymeric material as the optical storage medium.

It is another object of this invention to provide an optical storage device having a pattern of metal oxide particles embedded in a polymeric material.

It is another object of this invention to provide an optical storage device having a pattern of copper oxide particles embedded in a polymeric material.

It is another object of this invention to provide a method for fabricating an optical storage device using a polymeric material with a pattern of oxide particles embedded therein.

It is another object of this invention to provide an optical storage device using a polymeric material as the optical storage medium wherein the polymeric material is a polyamic acid metal complex with regions of polyimide having oxide particles embedded therein.

SUMMARY OF THE INVENTION

In its broadest aspect this invention is a polymeric material having a pattern of oxide particles embedded therein.

In a more particular aspect of the present invention, the structure having a polymeric material with a pattern of oxide particles therein is optically readable.

Another more particular aspect of the present invention, the polymeric material is a polyamic acid, a polyimide or combinations thereof.

In another more particular aspect of the present invention, the oxide particles are metal oxide particles.

In another more particular aspect of the present invention, the metal oxide particles are copper oxide particles.

In another more particular aspect of the present invention, the polymeric structure having a pattern of oxide particles embedded therein is fabricated by depositing a metal layer on a substrate and depositing over the metal layer a polymeric material. The structure is heated to form a polymer metal complex. The structure is then selectively heated at a higher temperature to form a pattern of polymeric material containing metal oxide particles therein.

In another more particular aspect of the present invention, a structure having a polymeric material containing a pattern of metal oxide particles embedded therein is fabricated by first depositing a metal pattern on a substrate and depositing thereover a polymeric material. The structure is heated to form regions coincident with the metal patterns containing metal oxide particles therein.

These and other objects, features and advantages will be apparent from the following more particular description of the preferred embodiments.

BRIEF DESCRIPTION OF THE DRAWINGS

FIG. 1 is a diagramatic perspective view in partial cross section of a prior art optical disk.

FIG. 2 is a diagramatic view of an apparatus to read the optical disk of FIG. 1.

DETAILED DESCRIPTION OF THE PREFERRED EMBODIMENTS

Figure 3:
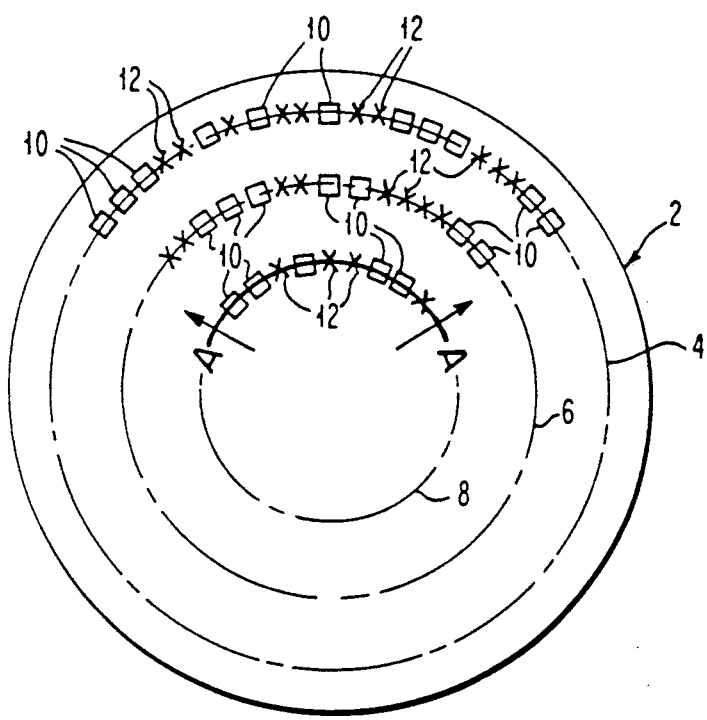
FIG. 3 is a top plan view of a particular embodiment of the structure of the present invention.

FIG. 1 shows a diagramatic sectional view of a prior art optical disk. Polymer layer 1 has a surface 2 embossed with a sequence of pits 3. Surface 2 is covered with a reflective coating 4. Optical beam 5 irradiates surface 6 of polymer layer 1 which is not coated with the reflective layer 4. The polymer layer is transparent to the optical beam. There is a different reflection from the pit regions 7 than from the non-pit regions 8 of reflective layer 4.

FIG. 2 diagrammatically shows the functional principle of reading the device of FIG. 1. The source 9 of optical beam 5 can be a laser. The beam is focused by lens 10. The beam 5 passes through beam splitter 11 and then through optical filter 12. The beam is then reflected off a deviating reflecting mirror 13 through a focusing element 14 onto track 15, of disk 16, which contains pits, as shown in FIG. 1. The beam reflects back through focusing element 14 onto deviating mirror 13 which reflects the beam ...ck to the beam splitter which splits the beam into beam 17 which is focused by lens 18 onto signal detector 19 which detects the pit sequence in track 15. The disk rotates to permit the beam 5 to scan over the track 15. The deviating mirror 13 directs the beam onto different tracks.

Optical storage media are typically in a disk shape 2 as shown in FIG. 3. The optical storage media does not have to be a disk shape. FIG. 3 is a simplified diagramatic plan view of an optical storage media according to the present invention. Three tracks 4, 6 and 8 are shown. On a portion of each track is shown a plurality of regions 10, shown as boxes, which have either a higher or lower reflectivity as compared to the plurality of regions 12, shown as X's, which are between regions 10. Each data location corresponds to a digital data storage of a 1 or 0 depending upon whether the region is high or low refelectivity. Typical prior art disks are formed from aluminum or tellurium or an alloy of tellurium and germanium. Pits or grooves are formed along the tracks in the aluminum, tellurium or tellurium germanium alloy surface along the tracks. Pits are made to form the regions of high or low reflectivity.

Figure 4:
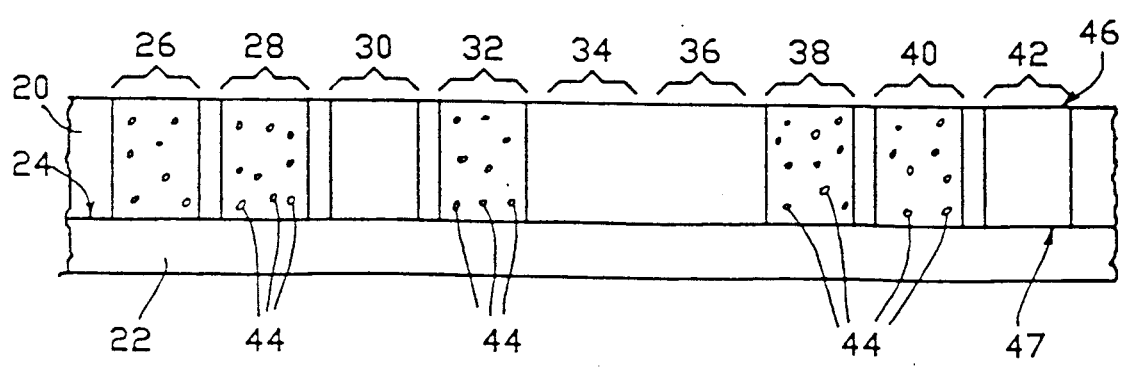
FIG. 4 shows a cross-sectional view along the line aa of FIG. 3 diagramatically showing the structure of the present invention.

FIG. 4 shows a cross section of the structure of the present invention along track 8 of FIG. 3, along the line AA. A polymeric layer 20 is disposed on a substrate 22. Substrate 22 has a surface 24 which reflects light. The optical beam to read the data stored on the optical storage device of FIG. 2 is selected to have a wavelength which reflects off of surface 24 or surface 24 is selected to be reflective of the wavelength of the optical beam used. FIG. 4 shows polymeric material having regions 26, 28, 32, 38 and 40 containing a plurality of particles 44 and regions 30, 34, 36 and 42 which do not contain particles 44. Particles 44 are oxide particles preferably metal oxide particles, most preferably copper oxide particles. The regions 26-42 correspond to the regions 10 and 12 of FIG. 3.

As an optical beam is scanned across track 10 along line AA of FIG. 3, the optical beam contacts surface 46 of polymer layer 20 which is not contacting substrate 22. When the optical beam contacts one of the regions 26 to 42 which does not have particles 44 therein, the optical beam passes through polymer 20 and reflects off of surface 24 of substrate 22 back through surface 46 of polymer layer 44. When the optical beam contacts one of the regions 26-44 having metal oxide particles 44 therein, the optical beam is either scattered by the particles or absorbed by the particles and therefore, it is not reflected back to surface 46. The light reflected back through surface 46 of polymer layer 20 is detected by commonly known means such as a photodetector, a photodiode, a photomultipler tube and the like. The wavelength of the optical beam is selected to pass through a preselected polymer 20 or the polymer is selected to be transparent to be preselected wavelength. A system of the type diagrammatically shown in FIG. 2 can be used to read the oxide particle pattern in the structure of FIG. 3 and FIG. 4.

In the preferred embodiment the oxide particle pattern is read by an optical beam reflecting off surface 24 of substrate 22. Alternatively, the optical beam can reflect off of surface 47 of polymer layer 20 thereby eliminating substrate 20 from the structure of FIG. 4. The oxide particle pattern can be read by directing an optical beam onto surface 46 of polymer layer 20 and detecting the light passing through surface 47 of polymer layer 20. More light will pass through regions 30, 34, 36 and 42 which do not contain particles 44 then through regions 26, 28, 32, 38 and 40 which contain particles 44 which absorb or scatter the light.

Figure 5:
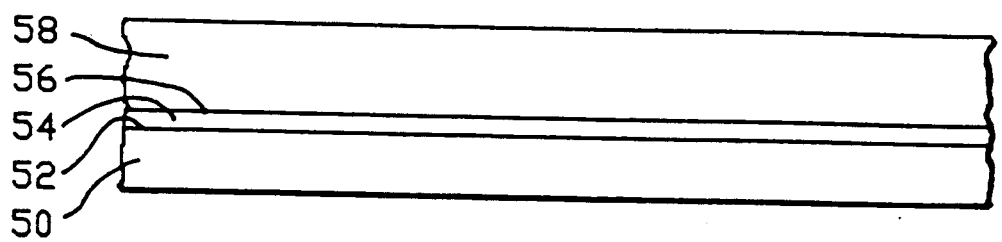
FIGS. 5–7 show one method of fabricating the structure of FIG. 3.
Figure 6:
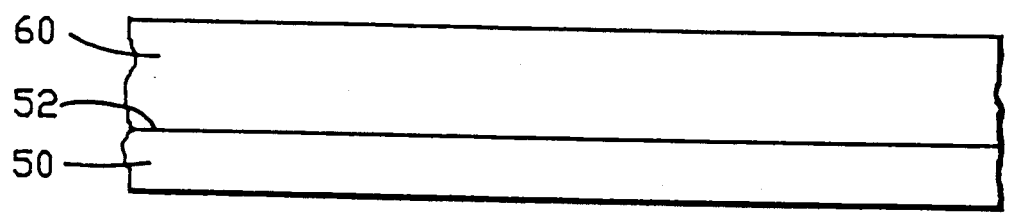
Figure 7:
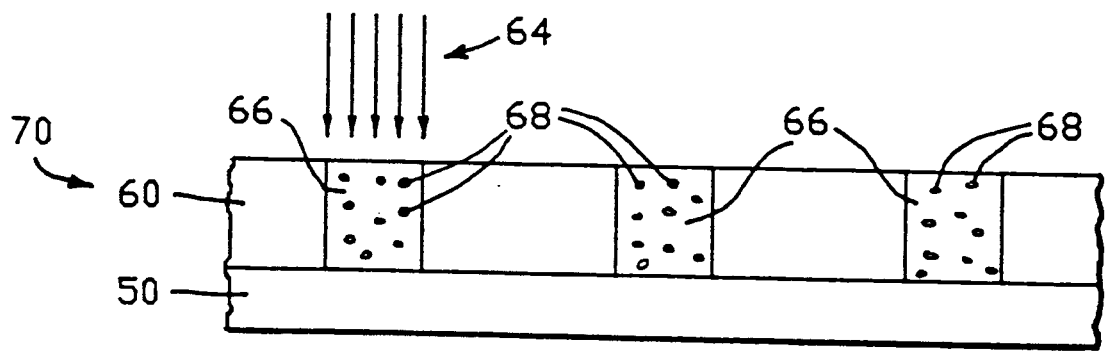

The preferred polymeric material to form layer 20 is a polyamic acid or a polyimide or a combination thereof. FIGS. 5-7 show one method of fabricating the structure shown in FIG. 3. Referring to FIG. 5, on substrate 50 having an optically reflective surface 52 a metal layer 54 is deposited. The substrate 50 can be aluminum, gold, silver, quartz, silicon or galium arsenide, and any other substrate having an optically reflective surface. A metal layer 54 is deposited onto surface 52. Metal 54 can be any metal which forms an oxide. Preferred metals are copper, nickel, and cobalt to form the following oxides $Cu_2O$, $NiO$ and $CoO$ respectively. The preferred oxide is copper oxide. The metal layer 54 can have any thickness. Preferably the metal layer 54 has a thickness less than about 1000 Å. On top surface 56 of metal layer 54 is disposed a liquid polymeric material 58. The preferred liquid polymer material is a polyamic acid. The most preferred polyamic acid is formed from reacting dianhydrides with a diamine. The most highly preferred polyamic acid is formed from pyromellitic dianhydride and oxydianaline commonly referred to in the art as a precursor to a PMDA-ODA polyimde. Metal layer 54 can be deposited by any means commonly known in the art such as sputter deposition, chemical vapor deposition, electroless plating and electroplating. Polymeric layer 58 can be deposited by any means commonly known in the art such as spin coating. Polymer layer 58 has a thickness from about 1 micron to about 50 micron, preferably from about 5 micron to about 10 micron. Between layer 54 and surface 52 there may be an adhesion layer.

In the preferred embodiment, metal layer 54 is copper and the polymeric layer 58 is PMDA-ODA polyamic acid. The structure of FIG. 5 is heated to a temperature sufficient for the metal atoms contained in layer 54 to form a complex with the polymeric molecules of layer 58 to form a polyamic acid copper complex. In the preferred embodiment, the structure of FIG. 5 is heated to a temperature to about 85° C. for about 30 minutes to form the PMDA-ODA-Cu complex.

In a second heating step, the polymer metal complex is selectively heated to form metal oxide precipitates in the selectively heated regions.

FIG. 6 shows the structure of FIG. 5 after the first heating step which forms the polymer metal complex. It has been found that for a copper layer 54 of thickness less than about 1000 Å after the first heating step, the copper layer essentially disappears and is incorporated into polymeric layer 58 to form polymeric complex layer 60 of FIG. 4. If the copper layer is greater than about 1000 Å copper will be left on surface 52 of substrate 50. In the preferred embodiment Cu layer 54 substantially completely complexed with polymeric layer 58. However, is not required that metal layer 54 be substantially completely consumed into polymeric layer 58.

The polymer metal complex can be selectively heated by any means commonly known in the art, for example by exposure to infrared radiation, to resistive heating, and the like. The preferred method of heating is using a focused optical beam, such as a laser. In the preferred embodiement where the metal layer 54 is copper and the polymeric material 58 is PMDA-ODA polyamic acid, a $CO_2$ laser of 100 $MW/cm^2$ power is used to selectively heat polymeric material 58.

FIG. 7 diagramatically shows the second heating step according to the present invention using an optical beam 64 which is directed at polymer metal complex layer 60. Optical beam 64 locally heats region 66 to a temperature sufficiently high to form a plurality of metal oxide particles 68 in region 66. Either the focused optical beam 64 or the structure 70 can be moved relative to each other to form a pattern of regions 66 containing metal oxide particles 68. The metal oxide particles have a size from about 30 Å to about 200 Å, preferably having a size of about 50 Å to 100 Å. The density of particles 68 in regions 66 has a range from about 300 particles per cubic micron to about 2000 particles per cubic micron. The minimum feature size of regions 66 achievable with process of FIG. 5 to FIG. 7 is about 0.1 microns by 0.1 microns.

Figure 8:
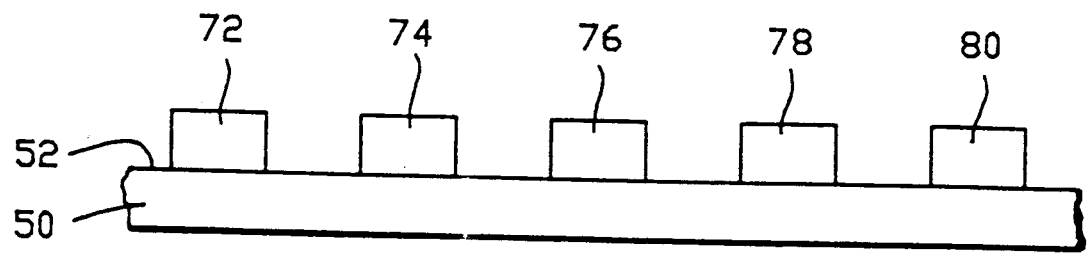
FIGS. 8, 9 and 10 show another method of fabricating the structure of FIG. 3.
Figure 9:
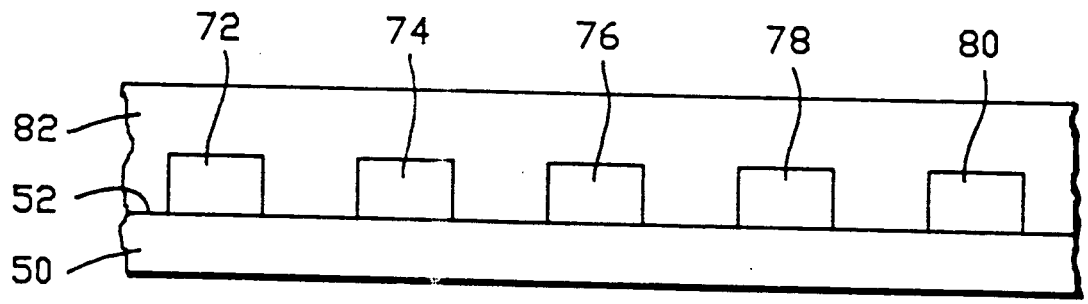
Figure 10:
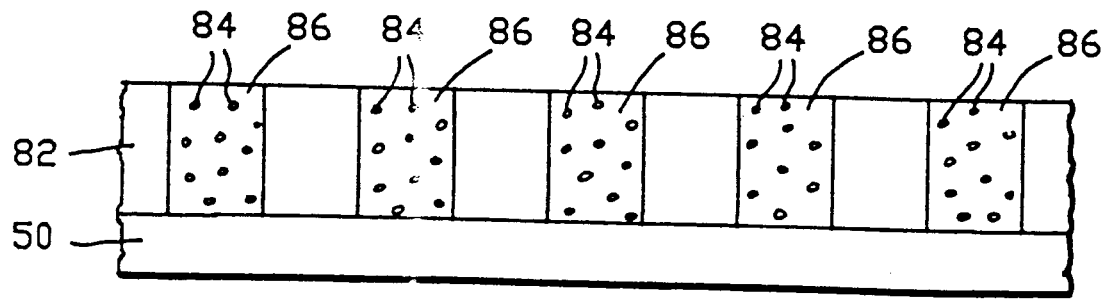

FIG. 8 to FIG. 10 show an alternate embodiment of a method to fabricate the structure of FIGS. 1 and 2. In FIG. 8 a metal pattern 72 is formed on the surface 52 of substrate 50. Substrate 50 is similar to the substrate 50 FIG. 5. Metal pattern 72-80 can be deposited on surface 52 by methods commonly known in the art such as sputter deposition or chemical vapor deposition through a metal mask or sputter deposition, chemical vapor deposition, electroless plating and electroplating through a patterned resist mask deposited on surface 54. Suitable resists are commonly used photoresist materials such as for example DuPont RESTON®, Ciba-Geigy 412® a photosensitive polyimide and the like. When a resist material is used, the remaining resist after the metal deposition is generally removed prior to the next step. FIG. 9 shows the structure of FIG. 8 with a polymeric material 82 deposited over the metal pattern 72-80. Polymeric material 82 is similiar to polymeric material 58 of FIG. 5. In the preferred embodiment, polymeric material 82 is a polyamic acid which is spin coated onto surface 52 to cover metal pattern 72-80. The thickness of metal pattern 72 can be any thickness. The preferred thickness of metal pattern 72-80 is from a monolayer to less than about 1000 Å. Polymer layer 82 has a thickness greater than about the thickness of the metal pattern 72 to 80. The structure of FIG. 9 is then heated to a temperature sufficient to have the metal in metal oxide pattern 72-80 to react with polymeric material 82 and to form metal oxide particles in regions 86 as shown in FIG. 10. The polymeric material between regions 86 do not contain metal particles 84. The minimum feature size of metal patterns 72-80 achievable using current technology is about 0.1 microns by 0.1 microns. This results in regions 86 having approximately the same cross-sectional area.

The locations of the regions, 86 can be formed in a predetermined sequence to form an optical storage device as shown in FIGS. 1 and 2.

The preferred polymeric material to practice the present invention is a polyamic acid. Preferably, the polymer should have a molecular weight and viscosity sufficient that it can be readily spun onto substrate 52.

The polyamic acids that are useful to practice the present invention include unmodified polyamic acids, as well as modified polyamic acids such as the amic acids corresponding to polyester imides, polyamide-imide-ester, polyamide-imides, polysiloxane-imides, as well as other mixed polyimides. Such are well-known in the prior art and need not be described in any great detail.

A polyimide can be readily converted into the polyamic acid counterpart by treatment with strong hydroxide such as NaOH and KOH.

Generally, the polyimides include the following recurring unit where the arrows indicate isomerism:

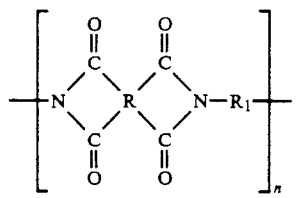

where n is an integer representing the number of repeating units to provide a molecular weight usually about 10,000 to about 100,000. R is at least one tetravalent organic radical selected from the group consisting of:

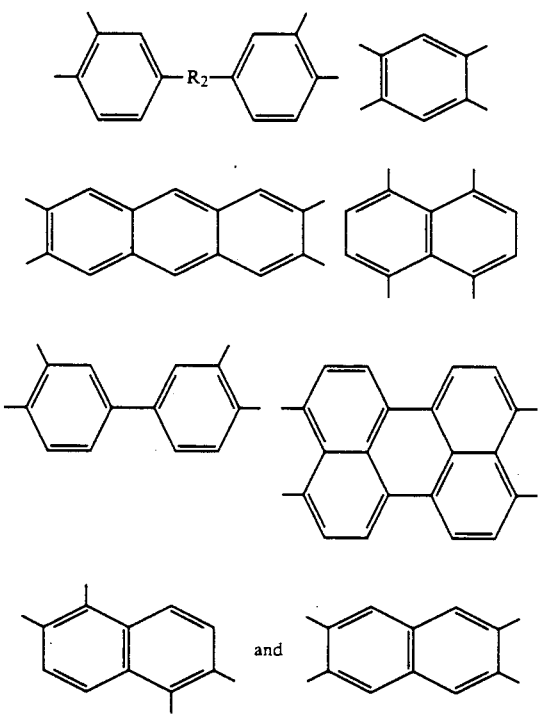

$R_2$ being selected from the group consisting of divalent aliphatic hydrocarbon radicals having from 1 to 4 carbon atoms and carbonyl, oxy, sulfo, sulfide, ether, siloxane, phospine oxide, hexafluorioisopropylidene and sulfonyl radicals and in which $R_1$ is at least one divalent radical selected from the group consisting of an aliphatic organic radical or from the group shown:

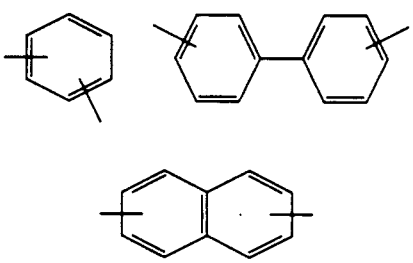

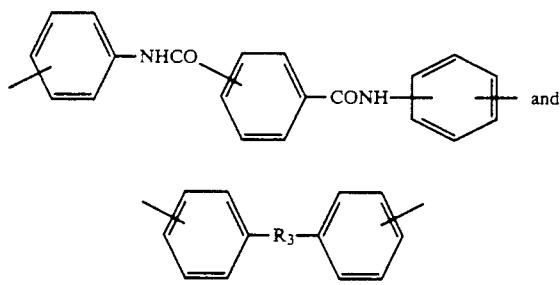

in which $R_3$ is a divalent organic radical selected from the group consisting of $R_2$, silico, and amino radicals. Polymers containing two or more of the R and/or $R_1$ radicals, especially multiple series of $R_1$ containing amido radicals, can be used.

Polyimides are available commercially from a variety of suppliers in one of three forms: a) as solutions of the polyamic acid precursors (e.g., DuPont Pyralin); as pre-imidized polyimide form (e.g., DuPont Kapton film); or c) as pre-imidized powders (e.g., Ciba-Geigy Matrimid 5218) or solutions (e.g., Ciba-Geigy Probimide). The chemistry of commerical polyimides includes examples of many of the components listed above, but a preferred polymer for use pursuant to the present invention is based on the monomers pyromellitic dianhydride (PMDA) and oxydianiline (ODA, also named 4,4'-diaminodiphenyl ether). Other preferred polymers for use pursuant to the present invention are the polymers of benzophenonetetracarboxylic dianhydrde (BTDA) and ODA and/or 1,3-phenylenediamine and polymer of 3,3'-biphenylenediamine (PDA Polyimide films based on PMDA-ODA are available from Allied Corporation under the tradename Apical and from DuPont under the tradename Kapton. Films based on BPDA-PDA are available from UBE Corporation as Upilex and from Hitachi Chemical Company as PIQ-L100. Other tradename polyimides useful pursuant to the present invention include Durimid from Rogers Corporation and the DuPont Pyralin series, including PI-2525 and PI 2566.

Although Applicant's do not want to be limited to a specific mechanism, Applicant's believe that process for fabricating the structure of FIG. 3 of the invention can be summarized by the following equations:

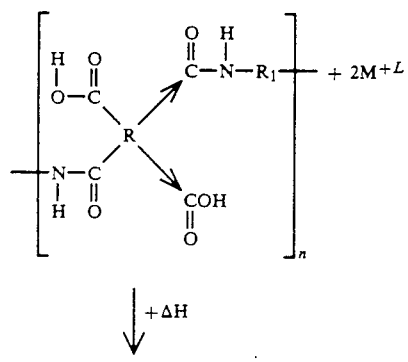

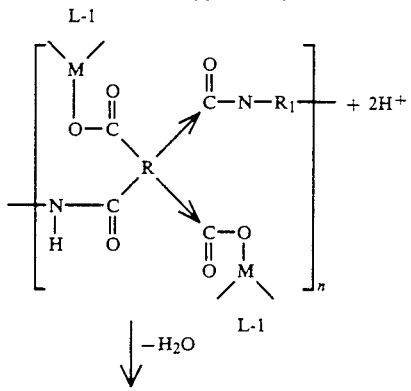

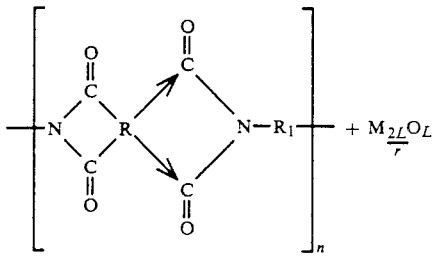

Equation 1 represents the chemical reaction of a polyamic acid with a metal layer. The polyamic acid preferably either contains water or the reaction is done in a humid environment. The reaction is accelerated by the presence of water or in a humid condition. Since polyamic acid always contains some water, any special treatment of polyamic acid for acceleration of the reaction is not necessary. The water reacts with the metal layer forming an ion $M^{+L}$. L represents an oxidation state of the cation. As shown in equation 2, the cation replaces a hydrogen atom on the carbonyl group of the polyamic acid. If the cation has a +1 oxidation state, the cation is bonded to one polyamic acid molecule. If the cation has a +L oxidation state, the cation is complexed with L carboxyl groups, either on the same polyimide molecule or on different polyimide molecules. In Equation 2, multiple complexing is represented by dashed lines. The symbol L-1 adjacent thereto to represent L-1 additional bonds. Polyamic acid is cyclized or imidized by removal of water to result in a polyimide as shown in Equation 3 with metal oxide particles $M_{2L/r}O_L$ where r is the valence of M. Complexing shown in Equation 2 occurs upon the addition of heat and the imidization as shown in Equation 3 occurs upon the extraction of water which is typically accomplished upon application of heat.

Figure 11:
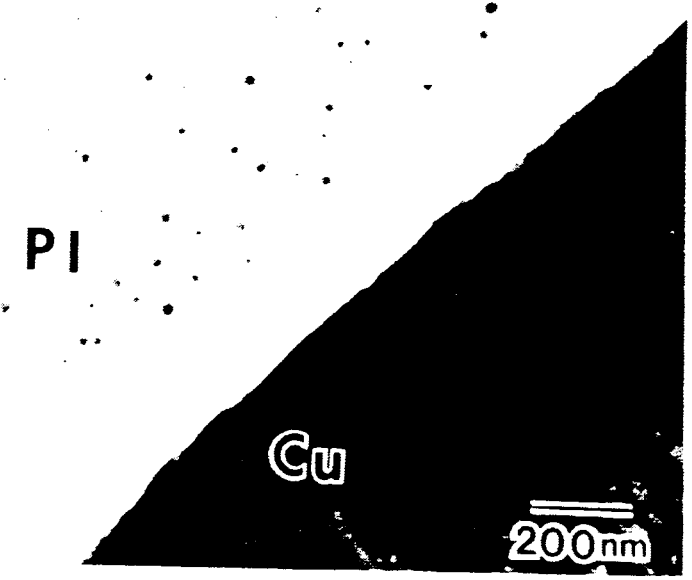
FIG. 11 shows a TEM of a region showing metal oxide particles within a polymeric material.

For example, onto a quartz substrate a 500 Å layer of chrome was sputter coated. On top of the chrome layer a two micron layer of copper was RF sputter coated. The chrome layer provides an adhesion layer of the copper to the quartz substrate. A 10 micron thick PMDA-ODA polyamic acid was spin-coated onto the copper layer. One sample was cured at 85° C. for 30 minutes and a second sample was cured at 400° C. for 30 minutes. The cure of the first sample creates a polyamic acid copper complex as shown in Equation 2 above. The cure of the second substrate creates copper oxide, $Cu_2O$, particles embedded in a polyimide formed from the polyamic acid. FIG. 11 shows a transmission electron micrograph of the interface between the copper layer and the polyimide layer of the structure of the second sample. As is clearly evident from the TEM of FIG. 11 particles have been formed in the polyimide layer.

Microdiffraction analysis of the particles by scanning transmission electron microcopy (STEM) using a 20 Å spot size showed that the particles are $CU_2O$. When a nickel metal layer is used the STEM analysis showed the particles were nickel oxide.

Figure 12:
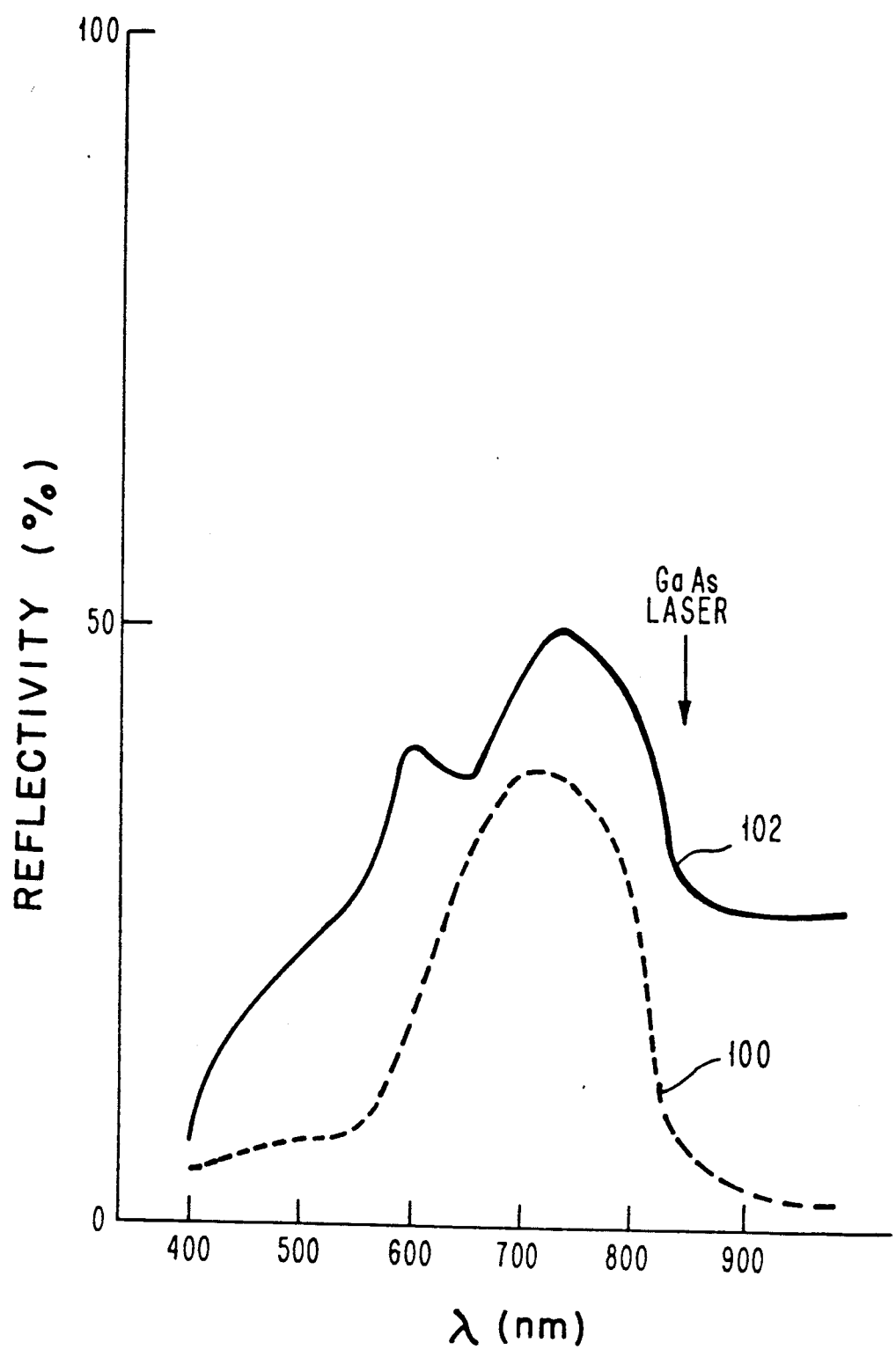
FIG. 12 shows the reflectivity of two samples exposed to different cure temperatures and times.

FIG. 12 shows the reflectivity of sample 1 represented by curve 100. The reflectivity of sample 2 represented by curve 102. The curve in FIG. 12 shows reflectivity as a function of wavelength of irradiated light. At the GaAs laser frequency marked on the figure there is a relatively large difference in the relfectivity of sample 1 and sample 2. The reflectivity of sample 1 being about 80% of the reflectivity of sample 2.

In summary, the invention herein is a structure having a polymeric layer with a pattern of regions containing oxide particles therein which is useful as an optical storage device and the methods of fabrication of the structure.

It is to be understood that the above described embodiments are simply illustrative of the principles of the invention. Various other modifications and changes may be devised by those skilled in the art which will embody the princilples of the invention and fall within the spirit and scope thereof.

Having thus described the invention, we claim as new and desire to secure by Letters Patent:

1. A structure comprising:
   a polymer body having a first region containing a polymeric material said polymeric material having a deprotonated carboxyl acid group complexed with a cation and having a second region containing an anhydride of said polymeric material; and
   a predetermined geometric pattern of oxide particles embedded in said second region.

2. The structure of claim 1, wherein regions of said polymer body containing said particles have a different optical reflectivity than regions of said polymers without said oxide particles.

3. The structure of claim 1, wherein said polymer body contains materials selected from the group of polyamic acid materials, polyimide materials and combinations thereof.

4. The structure of claim 1, wherein said oxide particles are metal oxide particles.

5. The structure of claim 4, wherein the metal constituent of said partilces is selected from the group of Cu, Ni, Co and combinations thereof.

6. The structure of claim 1, wherein said polymeric body is a layer having thickness of from about 1 um to about 100 um.

7. The structure of claim 1, wherein said particles have a size from about 30 Å to about 200 Å.

8. The structure of claim 1, wherein said particles have a density of from about 300 particles per cubic micron to about 2000 particles per cubic micron.

9. The structure of claim 1 wherein said pattern of oxide particles is optically readable.

10. The structure of claim 9, wherein said polymer body is disposed on an optically reflective surface.

11. The structure of claim 1, wherein said structure is an optical storage device.

12. The structure of claim 1, wherein said carboxyl containing polymeric material is a polyamic acid.

13. A structure comprising:
    a polymer body containing a polymer material selected from the group consisting of polyamic acid materials, polyimide materials and combinations thereof;
    a predetermined geometric pattern of oxide particles embedded in said polymer body; and
    regions of said polymeric material containing said particles are a polyimide material and the remainder of said polymeric material being a polyamic acid.

14. The structure of claim 13 wherein said structure is an optical storage device.

15. A structure comprising:
    a polymer body;
    a predetermined geometric pattern of oxide particles embedded in said polymer body; and regions of said polymeric material containing said particles are a polyimide material and the remainder of said polymeric material is a polyamic acid complex.

16. A structure comprising:
    a polymeric body having a first region containing a polymeric material, said polymeric material having a deprotonated carboxyl group complexed to a cation and having a second region containing an anhydride of said polymeric material;
    a predetermined geometric pattern of oxide particles embedded in said second region; and
    said pattern of oxide particles is optically readable by detecting light transmitted through said structure.

17. A structure comprising:
    a polymer body having a first region containing a polymeric material, said polymeric material having a deprotonated carboxyl group complexed to a cation and having a second region containing an anhydride of said polymeric material;
    a predetermined geometric pattern of oxide particles embedded in said polymer body; and
    said pattern of oxide particles optically readable by detecting light reflected from said structure.

18. A structure comprising:
    an optically reflective substrate;
    a polymeric layer disposed over said substrate, said polymeric layer being a polyamic acid metal complex;
    predetermined regions in said polymeric layer being a polyimide material with metal oxide particles dispersed therein, and
    said regions with said particles therein having an optical reflectance different than said polyamic acid metal complex.

19. The structure of claim 18, wherein said structure is an optical storage device.

* * * * *